United States Patent [19]

Nakao et al.

[11] Patent Number: 5,664,064
[45] Date of Patent: Sep. 2, 1997

[54] OBJECT FORM DIVISION METHOD AND SYSTEM

[75] Inventors: Takashi Nakao, Hitachi; Akira Maeda, Hitachinaka; Masayuki Noguchi; Taiichi Kadouno, both of Hitachi; Atsushi Suzuki, Hitachinaka; Eiji Suzuki, Hitachi, all of Japan

[73] Assignee: Hitachi Engineering Co., Ltd., Hitachi, Japan

[21] Appl. No.: 379,959

[22] Filed: Jan. 27, 1995

[30] Foreign Application Priority Data

Jan. 27, 1994 [JP] Japan ................................. 6-007765

[51] Int. Cl.$^6$ .................................................. G06F 15/18
[52] U.S. Cl. ................................ 395/13; 395/11; 395/51
[58] Field of Search ............................ 395/10–13, 50–51, 395/76

[56] References Cited

U.S. PATENT DOCUMENTS 4,912,664  3/1990  Weiss et al. ........................... 364/577

OTHER PUBLICATIONS

"FEM Element Divison Method for Improving its Operativity, to Simplify the Input Operation and to Shorten Operation Hours", Nikkei Mechanical, Feb. 1993, pp. 52–59.

"Automatic Mesh Generation Based on Expert-System-Methods", K. Reichert, et al, IEEE Transactions on Magnetics, vol. 27, No. 5, Sep. 1991, pp. 4197–4200.

"Genetic Algorithms In Search, Optimization, and Machine Learning", D. E. Goldberg, Addison–Wesley Publishing Co. Inc., 1989, Title page to page 24.

"Genetic Algorithm", H. Kitano, Sangyo Tosho, 1st Edition, Jun. 1993, Title page to page 17.

"Genetic Algorithm, Which Shows a Possibility to be Used in an Industrial Field", Nikkei AI, Autumn Issue, 1991, pp. 106–111.

Magele, C.A., et al., "Higher Order Evolution Strategies for the Global Optimization of Electromagnetic Devices", IEEE Transactions on Magnetics, vol. 29, No. 2, pp. 1775–1778 Mar. 1993.

Khan, A.I., et al., "Subdomain Generation for Parallel Finite Elecment Analysis", Computing Systems in Engineering, vol. 4, No. 4, pp. 473–489 Feb. 1993.

Gottvald, A, et al., "Global Optimization Methods for Computational Electromagnetics", IEEE Transactions on Magnetics, vol. 28, No. 2, pp. 1537–1540 Mar. 1992.

Kasper, M., "Shape Optimization by Evolution Strategy", IEEE Transactions on Magnetics, vol. 28, No. 2, pp. 1556–1560 Mar. 1992.

Preis, K., et al., "Comparison of Different Optimization Strategies in the Design of Electromagnetic Devices", IEEE Transactions on Magnetics, vol. 27, No. 5, pp. 4154–4157 Sep. 1991.

(List continued on next page.)

*Primary Examiner*—Tariq R. Hafiz
*Attorney, Agent, or Firm*—Antonelli, Terry, Stout & Kraus, LLP.

[57] ABSTRACT

A system for automatically dividing the form of an object to be analyzed using a finite element method, etc., into meshes, includes initial group generation means for generating a plurality of area division forms based on the form of the analysis object input through input means, and area division form evaluation means the generated area division forms. If the evaluation result does not satisfy a predetermined determination criterion, end determination means starts selection and crossover means for generating a new group and further starts mutation means for deforming the area division forms of the new group, then again starts the area division form evaluation means. If the evaluation result satisfies the predetermined determination criterion, an optimum area division form in the group is adopted as the optimum area division form. Division-into-meshes means subdivides the optimum area division form into meshes. The result of subdividing into the meshes is output to mesh output means. A method for automatically dividing the form of an object to be analyzed using a finite element method is also disclosed.

5 Claims, 14 Drawing Sheets

OTHER PUBLICATIONS

Preis, K., et al., "FEM and Evolution Strategies in the Optimal Design of Electromagnetic Devices", IEEE Transactions on Magnetics, vol. 26, No. 5, pp. 2181–2183 Sep. 1990.

Reichert, K., et al., "Automatic Mesh Generation Based on Expert–System–Methods", Advances in Electrical Engineering Software, pp. 95–108 Aug. 1990.

Tarnhuvud, T., "Problem–Oriented Adaptive Mesh–Generation for Accurate Finite–Element Calculation", IEEE Transactions on Magnetics, vol. 26, No. 2, pp. 779–782 Mar. 1990.

FIG.6

| No. | AREA DIVISION METHOD | ILLUSTRATION |
|---|---|---|
| 1 | IF THE INTERIOR ANGLE AT ONE NODE EXCEEDS 90°, A DIVISION LINE IS GENERATED AXIALLY FROM THE NODE FOR DIVIDING THE OBJECT FORM INTO AREAS. | 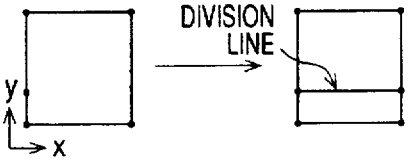 |
| 2 | A DIVISION LINE IS GENERATED FROM THE NODE HAVING THE MAXIMUM INTERIOR ANGLE TO THE MID POINT OF THE OPPOSED SIDE FOR DIVIDING THE OBJECT FORM INTO AREAS. | 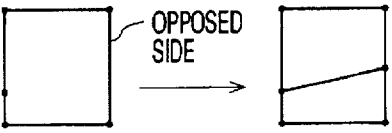 |
| 3 | IF A NORMAL CAN BE GENERATED IN THE DIRECTION OF "45° × m(m=0-7)" FOR A CIRCLE OR CIRCULAR ARC, THE NORMAL IS GENERATED FOR DIVIDING THE OBJECT FORM INTO AREAS. | 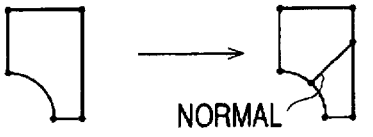 |
| 4 | IF A DIVISION LINE CAN BE GENERATED FROM THE MID POINT OF A CIRCULAR ARC TO THE NODE MOST DISTANT FROM THE MID POINT, THE DIVISION LINE IS GENERATED FOR DIVIDING THE OBJECT FORM INTO AREAS. | 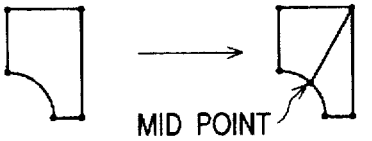 |
| 5 | IF EACH INTERIOR ANGLE DIFFERENCE OF A HEXAGON IS EQUAL TO OR LESS THAN A PREDETERMINED VALUE, A NODE IS GENERATED AT THE CENTER-OF-GRAVITY POSITION FOR DIVIDING THE OBJECT FORM INTO THREE AREAS. | 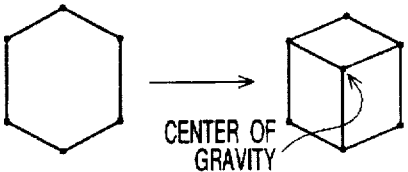 |

OBJECT FORM DIVISION METHOD AND SYSTEM

BACKGROUND OF THE INVENTION

1. Field of the Invention

This invention relates to a system and method for automatically dividing a form of an object to be analyzed (analysis object) into areas, for example, when a finite element method is applied for conducting various analyses of the object.

2. Description of the Related Art

Heretofore, various methods have been developed for an automatic mesh generation method for the finite element method, a technique of dividing the object into areas and conducting various analyses, such as a structure analysis and an electromagnetic field analysis.

Various methods, such as a fuzzy inference application method, a mapping technique application method, a method of section, and an adaptive method have been proposed; the methods are described in documents such as "Feb. 22, 1993, issue of Nikkei Mechanical, pp.52–59."

An area division method of the analysis object form using an expert system has also been developed; it is described in documents such as "K. Reichert et al.: *AUTOMATIC MESH GENERATION BASED ON EXPERT-SYSTEM-METHODS, IEEE TRANSACTIONS ON MAGNETICS*, VOL.27, NO.5, pp.4197–4200, SEP. 1991."

On the other hand, the genetic algorithm applied in the invention is an algorithm whose idea is conceived from the principles relating to the evolution of living things. It is a technique for learning, optimization, etc., using a probabilistic search; it is described in documents such as "Goldberg, D. E., *GENETIC ALGORITHM* in Search, Optimization, and Machine Learning, Addison Wesley, 1989," "*GENETIC ALGORITHM*, compiled by Hiroaki KITANO, Sangyo Tosho, First Edition on Jun. 3, 1993," and "Autumn Issue of Nikkei AI, pp.106–111, 1991."

By the way, in the fuzzy inference application method of the automatic mesh generation method in the related art as described above, basically triangle elements are generated on a two-dimensional plane. Thus, division of a three-dimensional form results in three-dimensional elements of tetrahedrons and it is difficult to generate three-dimensional elements having a hexahedron form at present.

In the mapping technique application method, the form of the analysis object is converted into a rectangular coordinate system and is divided into rectangular parallelopipeds, then the results are further subjected to inverse coordinate conversion for restoring to the original form. Thus, the forms of the objects to which the method is applicable are limited and it is difficult to perform flexible element division.

The method of section, which is a semi-automatic method, requires that the user should prepare so-called section generation axes. Further, the adaptive method repeats, more than once, a process in which initial meshes are generated, then an actual numerical analysis is made and meshes are regenerated based on the analysis result, and then a numerical analysis is made. Thus, costs required for calculation of division processing increase and if the initial meshes are not properly generated, analysis precision lowers remarkably.

Further, the mesh generation method using an expert system mentioned above is means for generating triangle elements at poor analysis precision.

On the other hand, when meshes generated by an actual analyst (user) are observed, he or she divides the object into fine meshes in a portion to be analyzed at high precision and rough meshes in other portions, based on his or her experiential knowledge for satisfying both the conditions of ensuring good analysis precision and reduction of costs required for calculation of division processing.

If the form of an object is given, the mesh generation state is not uniquely determined and various division forms into meshes generated by analysts for a single analysis object are possible. This means that the degree of freedom of the element division is high and the number of division method combinations becomes enormous in the mesh generation process.

The genetic algorithm is proposed as an effective method for solving a combinatorial optimization problem. In the algorithm for simulating the evolutionary process of living things, such as the generation of an initial group, evaluation of environment adaptability, selection, crossover, and mutation, determination of specific gene and chromosome structures, an environment adaptability evaluation method, and a processing method of selection, crossover, mutation, etc., dependent on the gene and chromosome structures are important problems to be considered when adopting the genetic algorithm.

SUMMARY OF THE INVENTION

It is therefore an object of the invention to provide a genetic algorithm appropriate for area division using experiential knowledge that actual analysts have for mesh generation of the object to be analyzed using a finite element method, etc., for controlling fineness of element division. As a result, quadrilateral elements (for two-dimensional area division) and hexahedral elements (for three-dimensional area division), which are division elements in the finite element method at good analysis precision, can be generated when the finite element method is applied.

To this end, according to the invention, there is provided an object form division method comprising the steps of:

inputting the form of an object;

assigning numbers to a plurality of prepared division rules for dividing the object form;

generating a plurality of random numbers that can take values in the range of the numbers assigned to the division rules;

generating N (N is a natural number) object division forms by dividing the object form according to the division rules selected corresponding to the generated random numbers;

finding an evaluation value for each object division form according to a predetermined evaluation rule;

if at least one of the evaluation values satisfies a predetermined division end determination criterion, determining that the object division form corresponding to the evaluation value is an optimum area division form resulting from dividing the object form into areas;

if none of the evaluation values satisfy the predetermined division end determination criterion, arbitrarily selecting two among the N object division forms;

if the two selected object division forms contain division pieces that can be exchanged in a state in which the object form can be retained, performing a crossover process of exchanging the division pieces between the two object division forms for generating new object division forms until N object division forms are generated; and only if a new generated random number satisfies a predetermined mutation probability, performing a mutation process of arbitrarily selecting one among the N object division forms generated at the crossover process step and dividing at least one divisible area forming a part of the selected object division form according to any one of prepared division rules for dividing areas, wherein the selection step, the crossover process step, and the mutation process step are performed until the evaluation value for one object division form satisfies the division end determination criterion.

The method may further comprise the step of arbitrarily selecting at least one division rules among prepared division rules for dividing areas and dividing the optimum area division form according to the selected division rules.

First, to make various analyses using the finite element method, etc., the form of the object to be analyzed is input with analysis conditions.

Next, to generate an initial group, one applicable area division method to the input form of the analysis object is selected at random from among area division methods previously stored as analyst's experiential knowledge and the object form is divided according to the selected method. At the time, preferably one area division method is again selected at random for each of the division pieces of the object, area division lines are generated, the division pieces are subdivided, and this sequence is repeated.

Finally, the original object form is divided into areas consisting of quadrangles and triangles and assuming that the predetermined number of individuals in the group is N, object division forms (area division forms) of N individuals are provided by repeating the process N times. The N-individual group is used as the initial group.

Next, the object division forms are evaluated. The area division form of each individual is evaluated based on a predetermined evaluation criterion. When the evaluation result for one individual satisfies the predetermined evaluation criterion, the process is terminated. In contrast, if the evaluation result does not satisfy the evaluation criterion, the process is not terminated.

When it is not determined that the process is terminated, a selection and crossover process is executed, wherein any two of the individuals are selected and areas, for example, areas having the same number of angles are exchanged between the two individuals to generate two new individuals. Further, a mutation process is executed, wherein each of N new individuals generated by repeating the crossover process is mutated at one probability, thereby changing the division forms of the areas.

On the other hand, if the evaluation result satisfies the predetermined evaluation criterion and the selection and crossover process need not be executed, a process of dividing into meshes is performed, wherein any division method is selected from among division methods prestored as analyst's experiential knowledge and a final mesh form is generated using the selected division method.

The finally generated mesh form is output to the output means such as the display means or print means.

BRIEF DESCRIPTION OF THE DRAWINGS

In the accompanying drawings:

FIG. 6 is an illustration showing area division method examples;

DESCRIPTION OF THE PREFERRED EMBODIMENT

Referring now to the accompanying drawings, there is shown a preferred embodiment of the invention.

Figure 15:
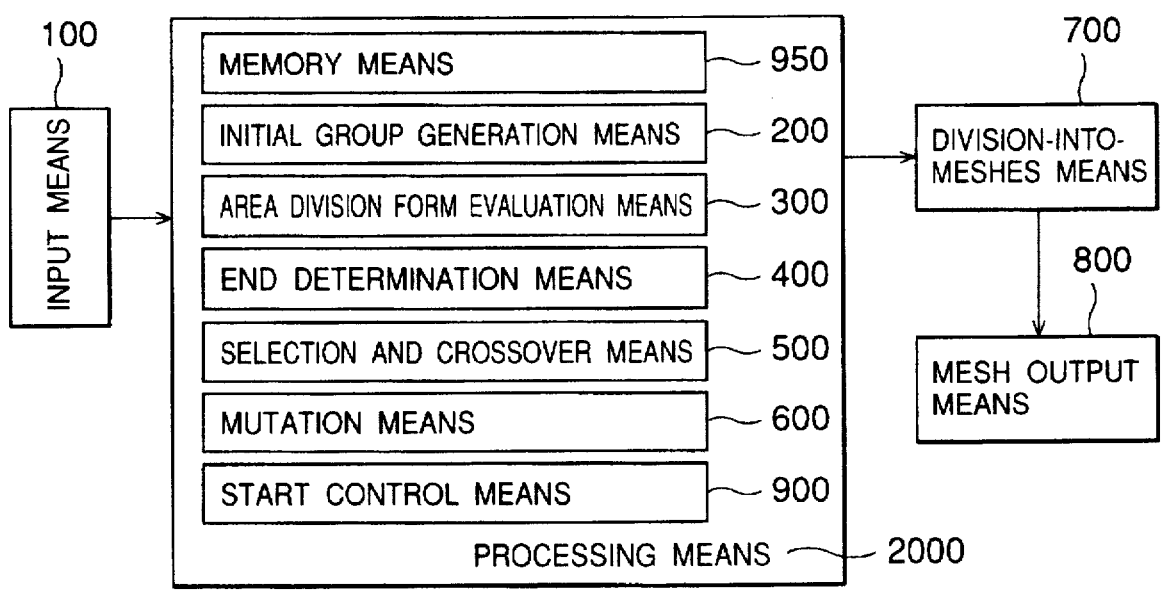
FIG. 15 is a block diagram of a system according to the invention.

FIG. 15 shows a configuration example of a system according to the invention. An embodiment of the system will be discussed with reference to FIG. 15.

The embodiment comprises input means 100, processing means 2000, division-into-meshes means 700, and mesh output means 800.

The processing means 2000 comprises initial group generation means 200, area division form evaluation means 300, end determination means 400, selection and crossover means 500, mutation means 600, storage means 950, and start control means 900.

The input means 100 is means for inputting at least the form to be analyzed (analysis form); for example, it can be provided by a keyboard, a mouse, etc. Preferably, necessary commands, constants required for operations, etc., can be input through the input means.

The mesh output means 800 is means for outputting the division state of the analysis object divided into meshes upon completion of a processing sequence; for example, it can be provided by display means such as a CRT, an EL display, or a liquid crystal display or print means such as a laser printer, a dot printer, or an X-Y plotter.

The initial group generation means 200 is means for generating a plurality of area division forms from the form of an object input through the input means 100.

The area division form evaluation means 300 is means for evaluating the generated area division forms.

If a predetermined determination criterion is not satisfied, the end determination means 400 starts the selection and crossover means 500 for generating a new group and further starts the mutation means 600 for deforming the area division forms of the new group, then again starts the area division form evaluation means 300. If the end determination means 400 determines that the determination criterion is satisfied, it adopts the optimum area division form in the group as the optimum area division form.

The start control means 900 is means for starting the area division form evaluation means 300, the end determination means 400, the selection and crossover means 500, and the mutation means 600 a predetermined number of times.

Processing of selection, crossover, mutation, etc., performed by the selection and crossover means 500 and the mutation means 600 will be discussed later in detail.

The storage means 950 is means for storing at least form division procedures previously obtained by experience and data required for various processing.

The initial group generation means 200, the area division form evaluation means 300, the end determination means 400, the selection and crossover means 500, the mutation means 600, the start control means 900, and the storage means 950 can be provided by electronic devices such as a CPU, ROM (previously storing predetermined processing programs), RAM, and various CMOS devices, for example.

The division-into-meshes means 700 subdivides the optimum area division form into meshes according to the division procedure stored in the storage means 950; for example, it can be provided by electronic devices such as a CPU, ROM (previously storing predetermined processing programs), RAM, and various CMOS devices.

Next, the basic operation of the system according to the invention, namely, a form division method according to the invention, will be roughly described with reference to FIG. 1.

First, at step 10, an input process of the analysis object form is performed. The input process may be executed manually by an analyst through the input means 100. Preferably, the analyst uses a digitizer to input the form for maintaining analysis precision.

Next, at step 20, the initial group generation means 200 performs an initial group generation process. That is, the initial group generation means 200 generates a plurality of area division forms based on the form input by the input process at step 10. Specifically, the input form is divided according to an arbitrarily selected rule from among rules based on rules of thumb previously stored in the storage means 950. This process is repeated, for example, N times (where N is a natural number) for generating an initial group of N individuals.

Next, at step 30, the area division form evaluation means 300 finds an evaluation value for each area division form, each component of the group (each of the N individuals). That is, the means executes an area division form evaluation process according to a predetermined evaluation criterion. A specific example of the evaluation criterion will be discussed below.

Next, at step 40, if the evaluation value does not satisfy a determination criterion predetermined and stored, for example, in the storage means 950, the end determination means 400 advances to step 50; if the evaluation value satisfies the determination criterion, it advances to step 70. Whether or not the evaluation value exceeds a predetermined threshold value may be used as the determination criterion, for example.

At step 50, the selection and crossover means 500 performs a selection and crossover process for generating a new group. A specific example of the selection and crossover process will be discussed later.

At step 60, the mutation means 600 executes mutation of deforming the new group, namely, a new area division form. Then, control returns to step 30 and steps 30, 50, and 60 are executed until the end determination criterion is satisfied at step 40. If the end determination criterion is satisfied, the optimum area division form (for example, the form having the greatest evaluation value) in the group is adopted as the optimum area division form and control advances to step 70.

Next, at step 70, the division-into-meshes means 700 subdivides the optimum area division form into meshes and at step 80, the mesh output means 800 outputs the resulting meshes.

The subdividing at step 70 may be performed according to an arbitrarily selected rule from among rules based on rules of thumb previously stored in the storage means 950. Therefore, division rules common to steps 20 and 70 may be used and previously stored in the storage means 950.

All division processes may be performed at steps 10, 20, 30, 40, 50, and 60 without providing step 70, that is, all division process may be performed using the genetic algorithm according to the invention.

Next, the initial group generation process 20 will be discussed with reference to FIGS. 2 to 7.

Figure 2:
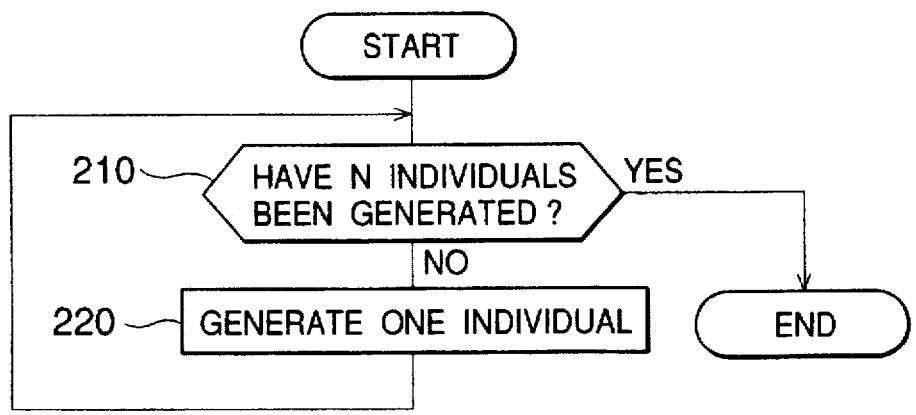
FIG. 2 is a flowchart showing a generation process procedure of an initial group.

FIG. 2 is a flowchart showing the procedure of the initial group generation process 20 in detail. First, a division process, namely, an individual generation process described below, is performed for a given form according to an arbitrarily selected rule from among rules based on rules of thumb previously stored in the storage means 950. Whether or not a predetermined number of individuals (N individuals) have been generated is determined at step 210. If the number of generated individuals is less than N, one additional individual is generated at step 220 and control returns to step 210.

If N individuals have been generated at step 210, the initial group generation process is terminated.

Next, a generation process of one individual will be discussed with reference to FIGS. 3 to 6.

The description to follow applies mainly to the form division process in the finite element method.

The number of "nodes" in the finite element method is assumed to be the number of angles of a form. That is, if a mathematical quadrangle has five nodes, it will be referred to as a pentagon. In other words, the number of nodes that one form has becomes the number of angles of the form.

Figure 3:
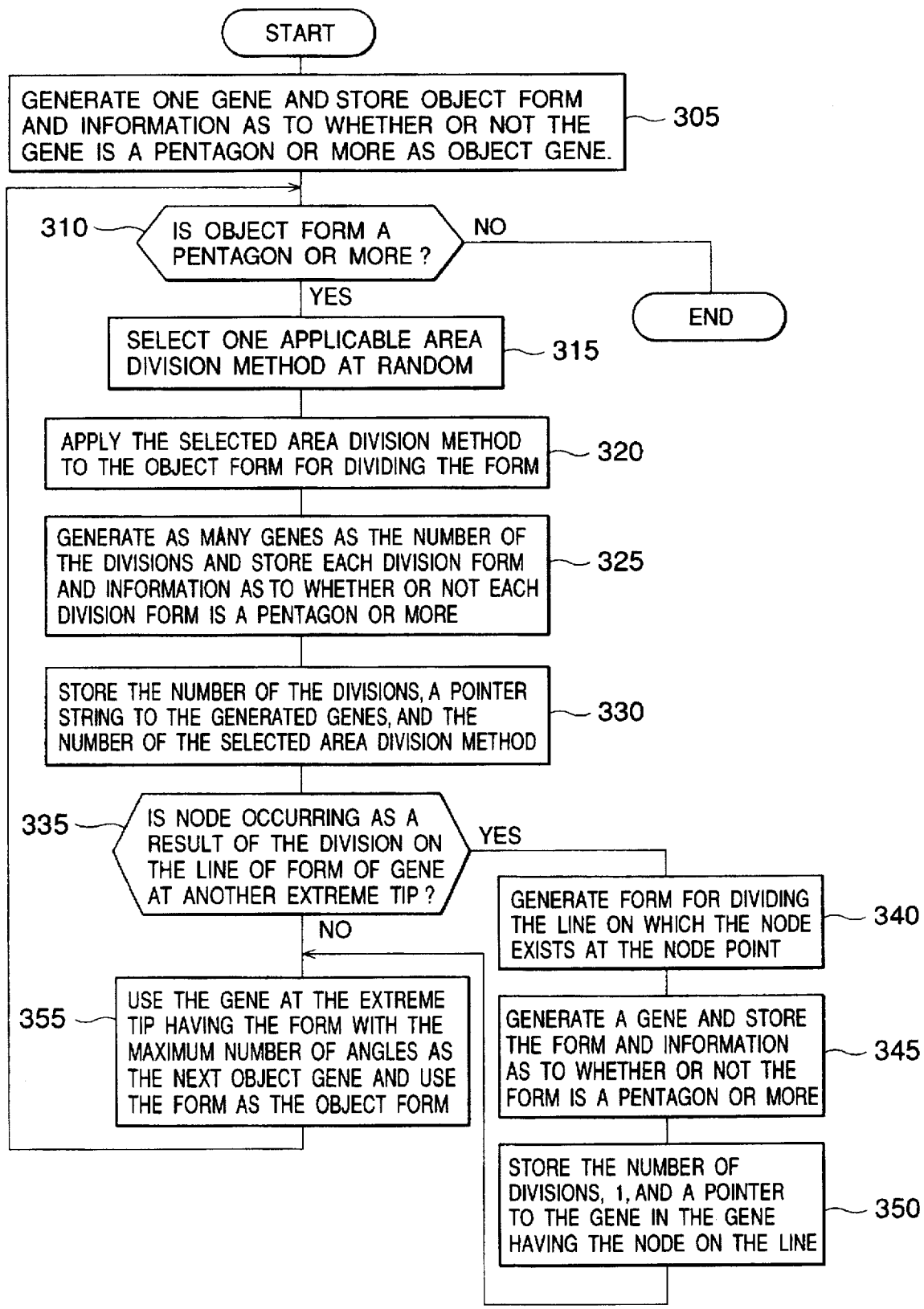
FIG. 3 is a flowchart showing a generation process procedure of an individual.

FIG. 3 is a flowchart showing the generation process of a new individual (step 220) in detail.

First, one initial gene is generated and the object form (gene form) and information as to whether or not the gene is a pentagon or has more are stored in the gene (the data structure of the gene will be discussed in FIG. 4) as object gene at step 305.

Next, whether or not the object form is a pentagon or more is determined at step 310. If it is a pentagon or more, one applicable division rule (area division method) is selected at random from among division rules based on rules of thumb previously stored in the storage means 950 at step 315 and the selected area division method is applied to the object form for dividing the object form at step 320.

To select one division rule (area division method) at random, for example, M division rules (area division methods) are prepared, numbers 1 to M are assigned to the division rules, and a random number that can take a value in the range of 1 to M is generated. Then, the division rule corresponding to the generated random number value may be selected.

Next, as many genes as the number of divisions of the form as a result of the division process at step 320 are newly generated and each division form and information as to whether or not each division form is a pentagon or more are stored at step 325. The number of divisions, a pointer string to the new generated genes, and the number of the selected area division method are stored in the object gene at step 330.

If a new node occurs as a result of the division, a determination is made as to whether or not the node is on the line of the form of the gene at another extreme tip (when one form is subdivided and the division state is represented by a tree, the form corresponding to a "leaf" will be hereinafter referred to as the "extreme tip") at step 335. If it is on the line, a new form for dividing the line on which the node exists at the node point is generated at step 340, a new gene is generated and the new form and information as to whether or not the form is a pentagon or more are stored at step 345, and the number of divisions, one, and a pointer to the new generated gene are stored in the gene having the form with the node existing on the line at step 350, then control branches to step 355.

If there is no gene having the form with the node on the line at step 335, the gene at the extreme tip having the form with the maximum number of angles is used as the next object gene and the form of the object gene is used as the object form at step 355, then control returns to step 310.

If it is determined that the form is less than a pentagon at step 310, the individual generation process is terminated.

Figure 4:
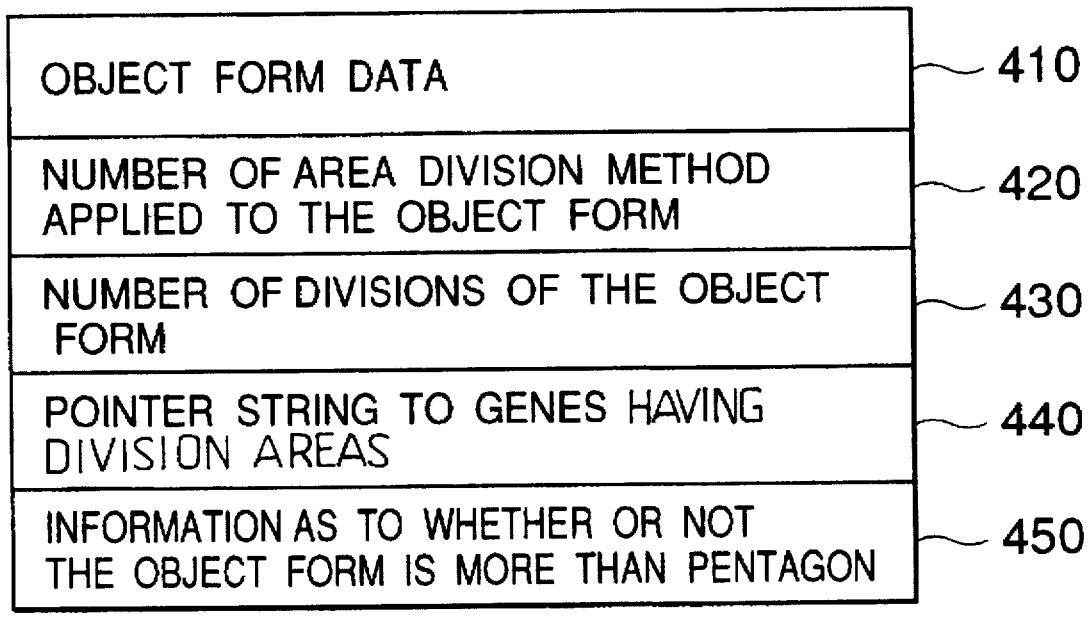
FIG. 4 is an illustration showing the data structure of a gene.

FIG. 4 shows the data structure of a gene.

As shown in FIG. 4, one gene comprises an object form data storage area 410, a storage area 420 of the number of the division rule (area division method) applied to the area division of the object form, a storage area 430 of the number of divisions resulting from the division of the object form, a storage area 440 of a pointer string to new generated genes when the object form is divided, and a storage area 450 of information as to whether or not the object form is a pentagon or more. The data may be stored in the storage means for each gene.

Figure 5:
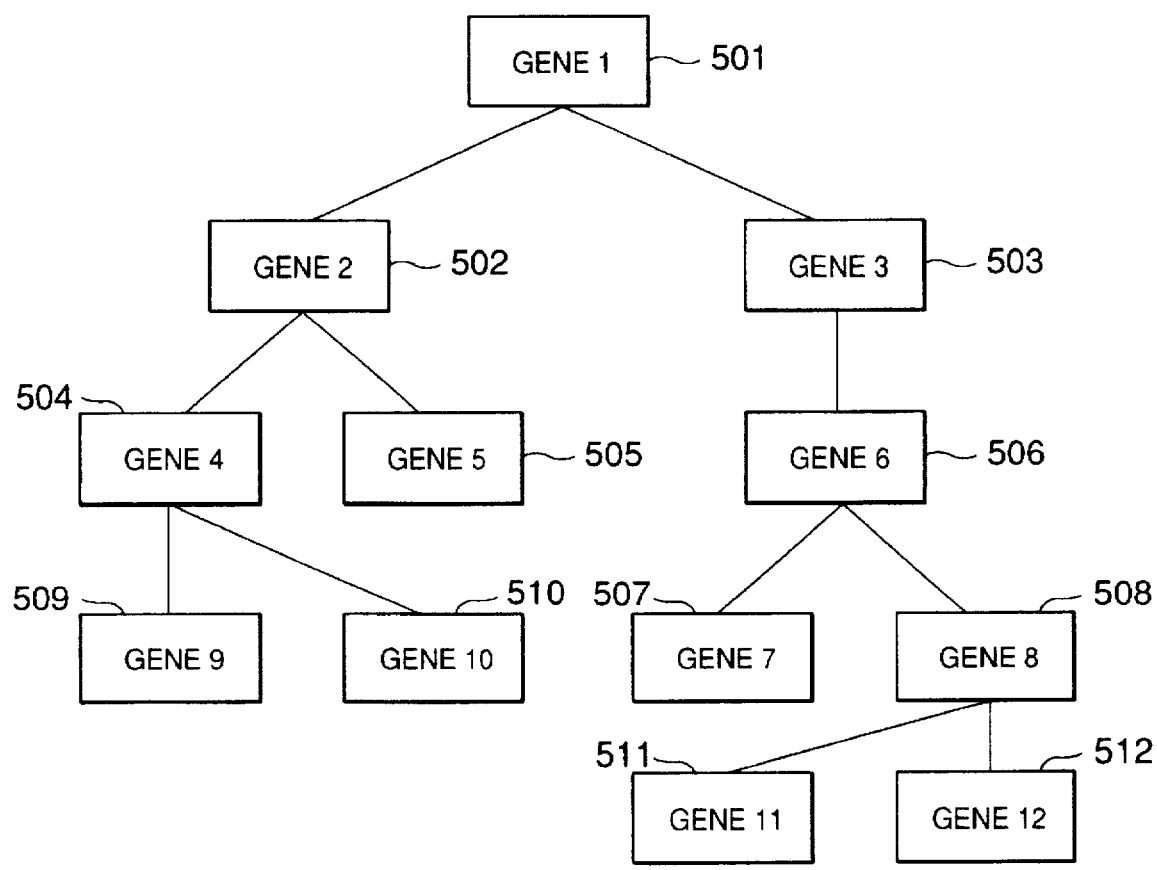
FIG. 5 is an illustration of a structure example of a chromosome.

FIG. 5 shows an example of the structure of a chromosome consisting of a plurality of genes.

One individual in the embodiment corresponds to one chromosome, which can be represented by a tree structure.

One area division method is applied to the object form that a gene 1 (501) has, thereby generating a gene 2 (502) and a gene 3 (503).

Further, one area division method is applied to the gene 2 (502), thereby generating a gene 4 (504) and gene 5 (505) and dividing the line forming the form of the gene 3 (503) in contact with a newly occurring node as a result of the area division of the gene 2 (502) for generating a gene 6 (506). The generation of the gene 6 will be discussed later in an easy-to-understand manner in conjunction with a specific example.

One area division method is applied to the gene 6 (506), thereby generating a gene 7 (507) and a gene 8 (508).

One area division method is applied to the gene 4 (504), thereby generating a gene 9 (509) and a gene 10 (510). Further, one area division method is applied to the gene 8 (508), thereby generating a gene 11 (511) and a gene 12 (512). The chromosome shown in FIG. 5 is made up of these genes. When the area division for the finite element method is executed according to the genetic algorithm, the relationship between the chromosome and genes can be represented by such a tree structure and such representation aids easy understanding. Therefore, in the embodiment, such a representation scheme will be used frequently.

FIG. 6 is an illustration showing examples of area division methods (division rules) for the forms a pentagon or more based on analyst's experiential knowledge; for example, one of the methods is selected at step 315 in FIG. 3.

In FIG. 6, only five area division methods are listed; in fact, a large number of division methods are possible and are stored in the storage means 950.

The area division methods shown in FIG. 6 will be briefly discussed.

Area division method 1: If one of the nodes that the object form has, has an interior angle exceeding 90°, a division line is generated axially (in the figure, in the X axis direction) from the node, for dividing the object form into areas.

Area division method 2: A division line is generated from the node corresponding to the maximum interior angle that the object form has, to the mid point of the opposite side, for dividing the object form into areas.

Area division method 3: If a normal can be generated in the direction of "45°×m (m=0 to 7)" in the case where the object form contains a circle or circular arc, the normal is generated for dividing the object form into areas.

Area division method 4: If the object form contains a circular arc, a division line connecting the mid point of the circular arc and the node most distant from the mid point is generated for dividing the object form into areas.

Area division method 5: If each interior angle difference of a hexagon is equal to or less than a predetermined value, a node is generated at the center-of-gravity position of the hexagon for dividing the object form into three areas.

Next, an operation example of individual generation will be discussed specifically with reference to FIGS. 3 to 7. The area division process for the finite element method is taken as an example, as described above. In the figures, the black dot "•" that each form has denotes a node in the finite element method.

Figure 7:
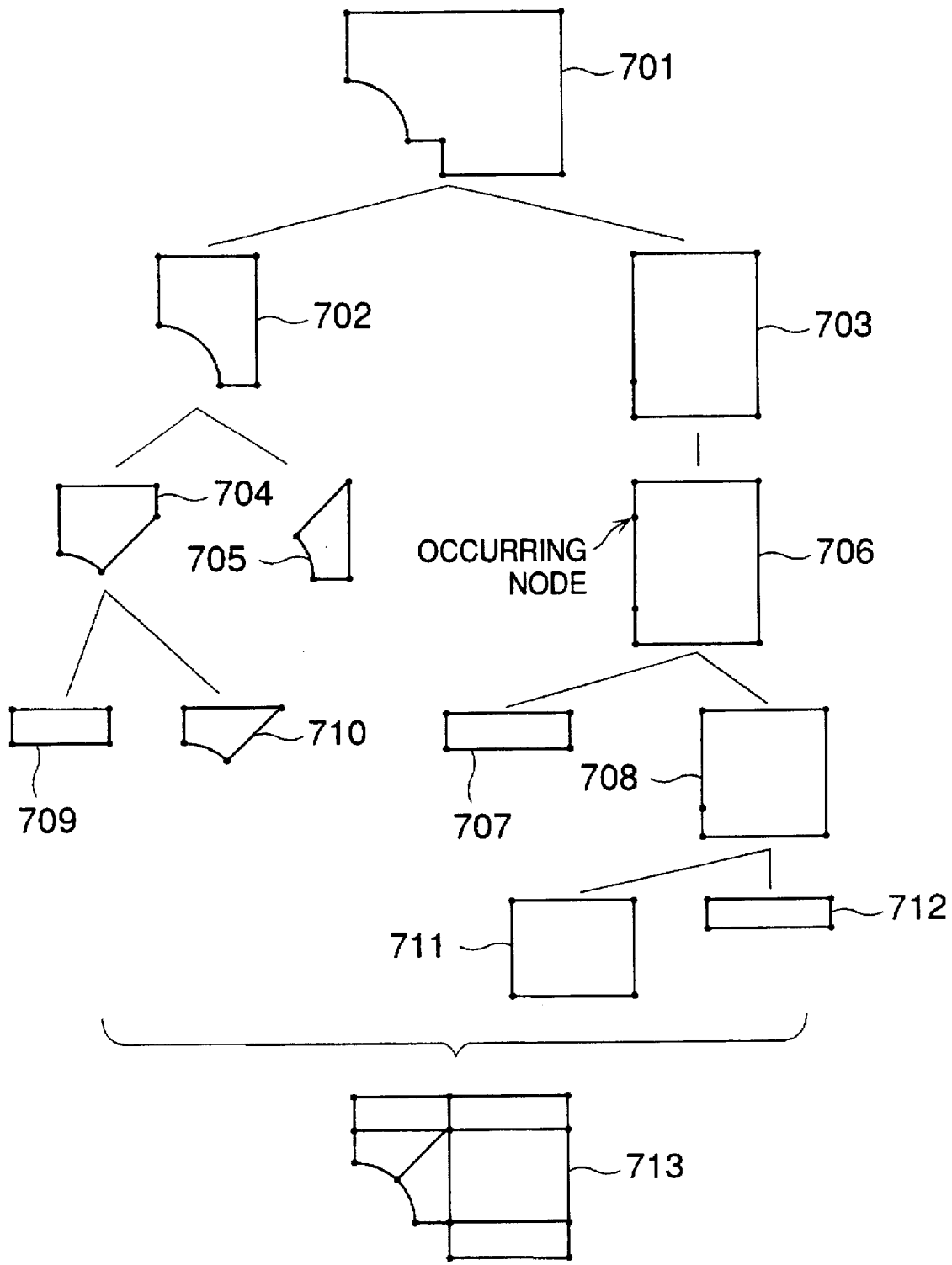
FIG. 7 is an illustration of an area division example.

First, as shown in FIG. 7, the initially given object form is called form 701. This corresponds to generation of one gene 1 (501) shown in FIG. 5. The form 701 and information indicating that the form 701 is a pentagon or more (the form 701, which has seven nodes, is a heptagon as in the above-mentioned definition) are stored in 410 and 450 shown in FIG. 4 as gene data for using the gene 1 as the object gene (step 305).

Next, since the gene 1 is a heptagon (step 310), for example, area division method 1 is selected at random (step 315) and the form 701 is divided into form 702 and form 703 according to the selected area division method 1 (step 320).

That is, the gene 2 (502) and the gene 3 (503) shown in FIG. 5 are generated; the form 702 and information indicating that the form 702 is a pentagon or more are stored in 410 and 450 as gene data for the gene 2 and the form 703 and information indicating that the form 703 is a pentagon or more are stored in 410 and 450 as gene data for the gene 3 (step 325). The information may be stored in the storage means 950 in relation to the genes.

Next, the number of divisions, two, pointers to the genes 2 and 3, and the area division method 1 are stored as the gene data of the gene 1, the object gene (step 330).

At this stage, there is no gene at the extreme tip having a form with an occurring node existing on the line (step 335), thus the gene 2 having the form with the maximum number of angles is selected as the next object gene. That is, the form 702 becomes the next object form (step 355).

Since the object form 702 is a pentagon (step 310), for example, area division method 3 is selected at random (step 315) and the form 702 is divided into forms 704 and 705 (step 320). That is, the gene 4 (504) and the gene 5 (505) shown in FIG. 5 are generated; the form 704 and information indicating that the form 704 is a pentagon or more are stored in 410 and 450 as gene data for the gene 4 and the form 705 and information indicating that the form 705 is less than a pentagon are stored in 410 and 450 as gene data for the gene 5 (step 325).

The number of divisions, two, pointers to the genes 4 and 5, and the area division method 3 are stored as the gene data of the gene 2, the object gene (step 330).

At this stage, there is the gene 3 at the extreme tip having the node occurring corresponding to generation of the form 704 existing on a line, thus a form 706 for dividing the line on which the node exists at the node point is generated (step 340), namely, a new gene 6 (506) is generated and the form 706 and information indicating that the form 706 is a pentagon or more are stored in 410 and 450 as gene data (step 345) and the number of divisions, one, and a pointer to the gene 6 are stored in the gene 3 having the form with the node existing on the line (step 350), then control goes to step 355.

Since the form of the gene 6 has the maximum number of angles, six, the gene 6 becomes the next object gene and the form 706 becomes the next object form (step 355), then control returns to 310.

Since the form 706 is a pentagon or more (step 310), for example, area division method 1 is selected at random (step 315) and the form 706 is divided into forms 707 and 708 (step 320). That is, the gene 7 (507) and the gene 8 (508) are generated. The form 707 and information indicating that the form 707 is less than a pentagon are stored in 410 and 450 as gene data for the gene 7 and the form 708 and information indicating that the form 708 is a pentagon or more are stored in 410 and 450 as gene data for the gene 8 (step 325).

The number of divisions, two, pointers to the genes 7 and 8, and the area division method 1 are stored as the gene data of the gene 6, the object gene (step 330). At this stage, there is no gene at the extreme tip having a form with the occurring node as a result of the division existing on the line (step 335), thus the gene 4 having the form with the maximum number of angles is selected as the next object gene. That is, the form 704 becomes the next object form (step 355), then control returns to step 310.

Since the object form 704 is a pentagon (step 310), for example, area division method 1 is selected at random (step 315) and the form 704 is divided into forms 709 and 710 (step 320). That is, the gene 9 (509) and the gene 10 (510) are generated. The form 709 and information indicating that the form 709 is less than a pentagon are stored in 410 and 450 as gene data for the gene 9 and the form 710 and information indicating that the form 710 is less than a pentagon are stored in 410 and 450 as gene data for the gene 10 (step 325).

Since there is no gene at the extreme tip having a form with the occurring node as a result of the division existing on the line (step 335), the gene 8 having the form with the maximum number of angles is selected as the next object gene and the form 708 becomes the next object form (step 355), then control returns to step 310. Since the form 708 is a pentagon (step 310), area division method 1 is selected at random (step 315) and the form 708 is divided into forms 711 and 712 (step 320). The gene 11 (511) and the gene 12 (512) are generated and the form 711 and information indicating that the form 711 is less than a pentagon are stored in 410 and 450 as gene data for the gene 11 and the form 712 and information indicating that the form 712 is less than a pentagon are stored in 410 and 450 as gene data for the gene 12 (step 325).

Since there is no gene at the extreme tip having a form with the occurring node as a result of the division existing on the line (step 335), the gene 7 having the form with the maximum number of angles is selected as the next object gene. That is, the form 707 becomes the next object form (step 355), then control returns to step 310. Since the form 707 is a quadrangle (step 310), the individual generation is terminated.

The individual generation process divides the form 701 into areas like a form 713 shown in FIG. 7.

Next, the area division form evaluation means 300 may use predetermined evaluation expressions; various evaluation expressions are possible:

For example, the following expressions 1 and 2 may be used for evaluation:

Interior angle evaluation value$_i$ = (Expression 1)

$$\left\{ \sum_{j=1}^{4} (90 - |90 - \text{interior angle of node}_{ij}|)/90 \right\} /4$$

Evaluation value = (Expression 2)

$$\left\{ \left( K + \sum_{i=1}^{K} \text{interior angle evaluation value}_i \right) /A \right\}^2$$

where i is the number assigned to an existing quadrangle, j is the number assigned to an angle that one quadrangle has, K is the number of quadrangles in the area division form, and A is the total number of quadrangles and triangles.

The end determination means 40 has a function of terminating the process if the evaluation value found according to Expressions 1 and 2 becomes equal to or greater than a predetermined value, for example.

When the best evaluation value of each generation does not improve over predetermined G generations, the end termination means 40 may determine the process end.

Next, a selection and crossover process in the selection and crossover means 500 will be discussed in detail with reference to FIGS. 8 and 9.

Figure 1:
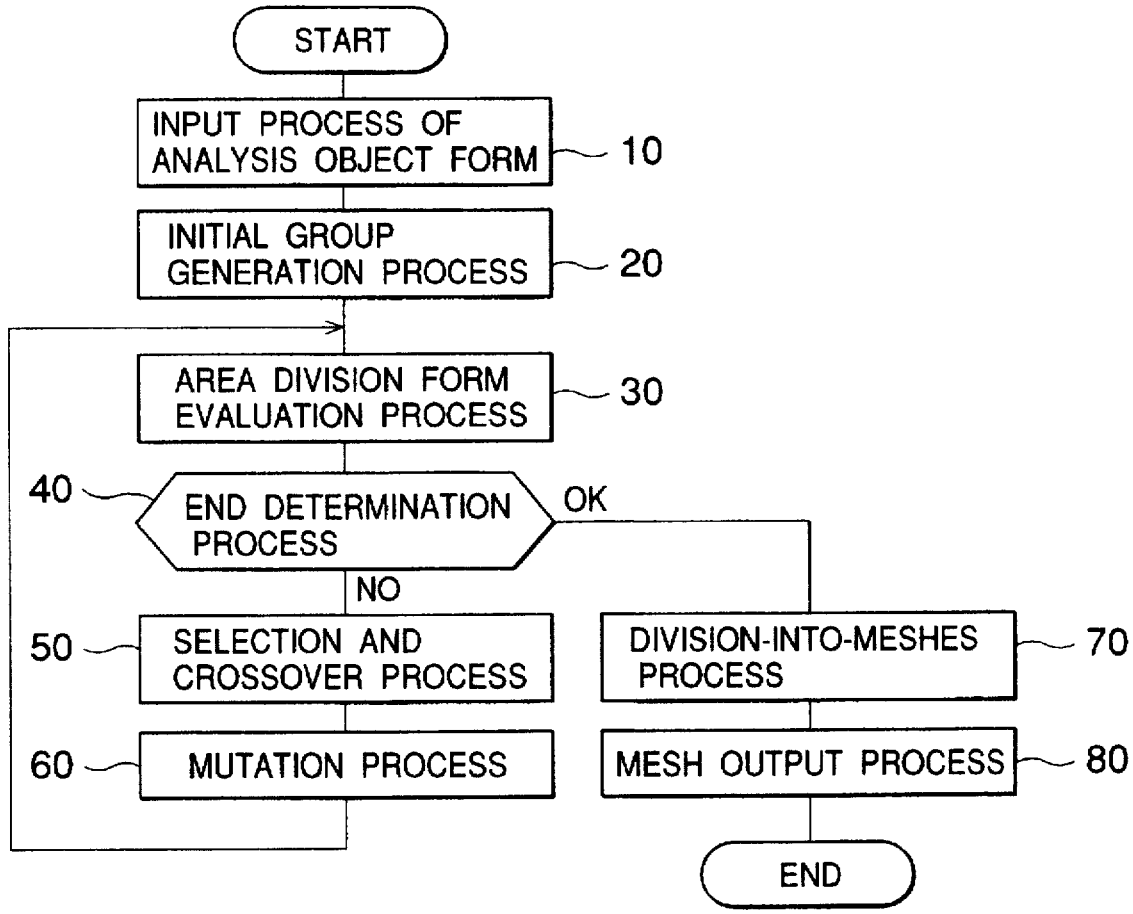
FIG. 1 is a flowchart showing a basic process procedure of the invention.
Figure 8:
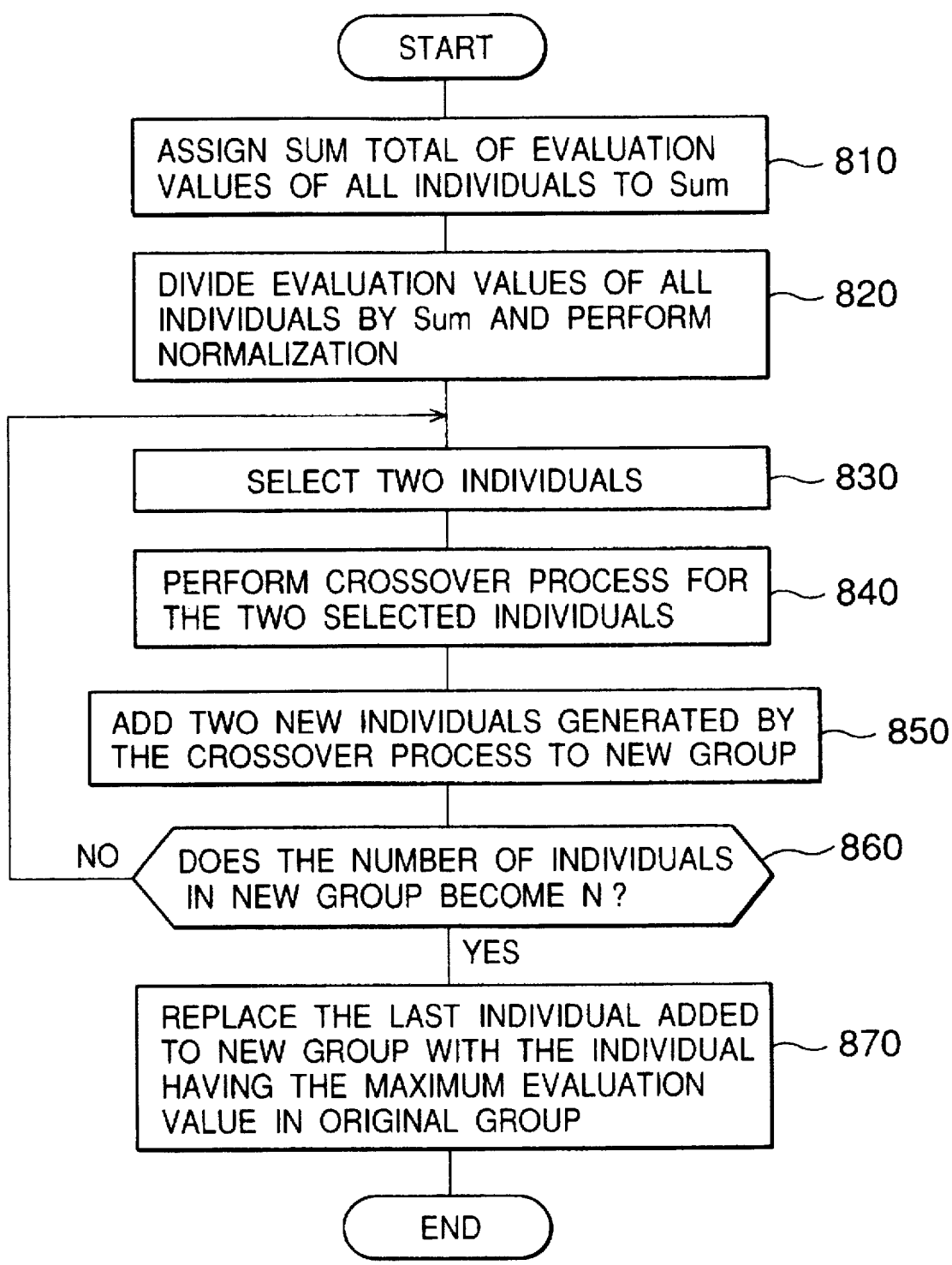
FIG. 8 is a flowchart showing a process procedure performed by selection and crossover means.

FIG. 8 is a flowchart showing the selection and crossover process shown at step 50 in FIG. 1.

First, at step 810, the sum total of the evaluation values of all individuals is found for the original group where the individual generation is completed, and the found sum total is assigned to a variable Sum.

Next, at step 820, the evaluation values of all individuals are divided by Sum and normalization processing is performed.

At step 830, two individuals are probabilistically selected from among the group based on the evaluation value of each individual. For example, a so-called roulette wheel is prepared based on the evaluation value of each individual (for example, the ratio of the evaluation value of each individual to Sum corresponds to the occupation area percentage of the individual in the roulette wheel). Two random numbers are generated and the individuals indicated by the two random numbers may be selected.

At step 840, a crossover process is performed for the two selected individuals. At step 850, two new individuals generated by the crossover process are added to a new group. At step 860, whether or not the number of individuals in the new group becomes a predetermined number, namely, N is determined. If the number of individuals in the new group is less than N, control returns to step 830.

The crossover process will be discussed later by taking a form division process in a finite element method analysis as a specific example.

Next, if the number of individuals in the new group is equal to or greater than N at step 860, the last individual added to the new group is replaced with the individual having the maximum evaluation value in the original group at step 870, and the selection and crossover process is terminated.

Figure 9:
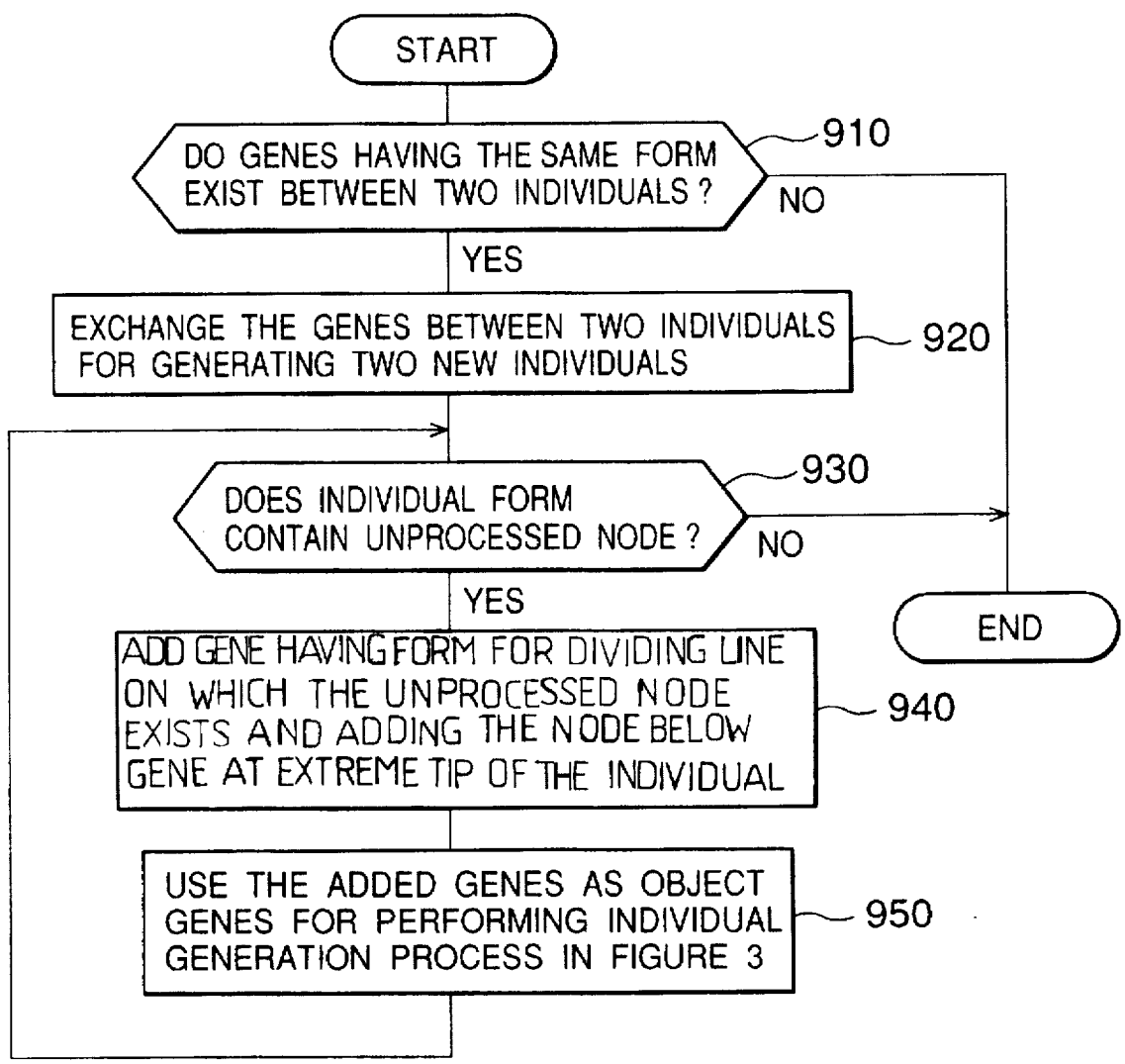
FIG. 9 is a flowchart showing a crossover process procedure of two individuals.

Next, FIG. 9 shows the crossover process procedure in step 840 as a flowchart.

First, at step 910, whether or not genes having the same form exist between two individuals is determined. If the genes having the same form do not exist, the process is terminated.

At step 910, whether or not forms having the same number of angles exist between two individuals may be determined rather than determination as to whether or not genes having the identical form exist between two individuals, because, for example, a crossover process of analogous areas or areas having the same vertical angle, such as a square and a rectangle having the same number of angles (nodes), is also possible.

If genes having the same form exist between two individuals at step 910, the two genes are exchanged between the two individuals to generate two new individuals at step 920, and whether or not the individual form contains an unprocessed node is determined at step 930.

If no unprocessed node is contained, the process is terminated.

If the individual form contains an unprocessed node, a gene having a form for dividing the line on which the unprocessed node exists and adding the node is added below the gene at the extreme tip that the individual has at step 940, then the added gene is used as the object gene for performing the individual generation process shown in FIG. 3 at step 950, and control returns to step 930.

As described above, whether or not forms having the same number of angles exist between two individuals is determined, and if the forms having the same number of angles exist, the crossover process of exchanging the forms between the two individuals may be performed. At this time, if the forms are analogous, for example, corresponding nodes are determined between the individuals and a graphics conversion process may be performed so that each of them matches the form of the other individual. For example, affine transformation or any other graphics conversion technique may be used for the processing.

Next, a crossover process example of two individuals will be discussed with reference to FIGS. 9 and 10A to 10H.

Figure 10A:
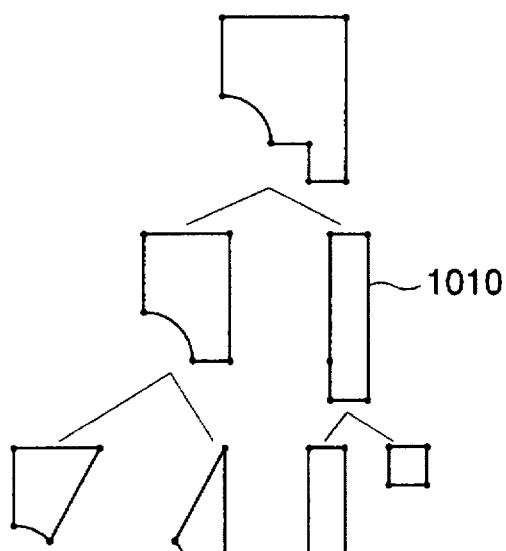
FIGS. 10A to 10H are illustrations of a crossover process example.
Figure 10B:
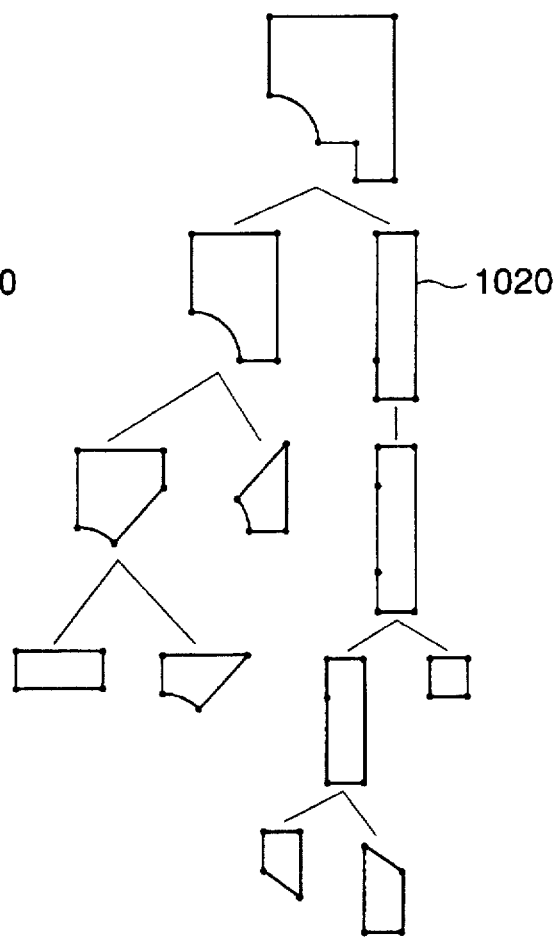
Figure 10C:
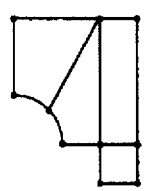
Figure 10D:
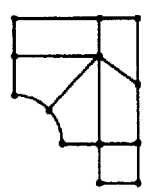
Figure 10E:
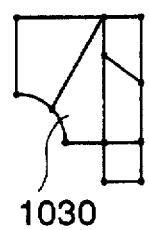
Figure 10F:
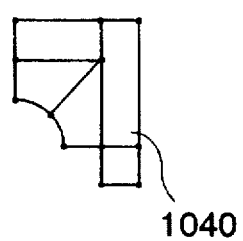
Figure 10G:
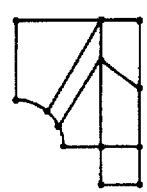
Figure 10H:
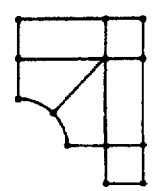

FIGS. 10A and 10B show two selected individuals, FIG. 10C shows a form divided into areas by the individual FIG. 10A, FIG. 10D shows a form divided into areas by the individual FIG. 10B, FIGS. 10E and 10F show forms resulting from exchanging form 1010 and subordinates, which mean subordinate forms linked to the form when the division state is represented by a tree structure as shown in FIGS. 10A or 10B, and form 1020 and subordinates between the two individuals and dividing the line on which an unprocessed node exists, and FIGS. 10G and 10H show final forms resulting from dividing pentagon forms 1030 and 1040 shown in FIGS. 10E and 10F according to any division rule selected among predetermined division rules and performing a crossover process of the two individuals.

Whether or not genes having the same form exist between the two individuals shown in FIGS. 10A and 10B is determined (step 910).

Since the forms 1010 and 1020 are completely the same, the genes corresponding to the forms are exchanged between the two individuals for generating two new individuals (step 920). Since the individual form contains an unprocessed node (step 930), a gene having a form for dividing the line on which the unprocessed node exists and adding the node is added below the gene at the extreme tip of the individual (step 940).

As a result of executing the steps, the area division forms of the two individuals become as shown in FIGS. 10E and 10F. The forms of the two added genes become the pentagon forms 1030 and 1040 in FIGS. 10E or 10F.

The added genes are used as object genes for performing individual generation process discussed with reference to FIG. 3 (step 950). Since the individual form does not contain an unprocessed node (step 930), the final area division forms of the two new individuals become as shown in FIGS. 10G and 10H.

Next, the mutation process performed by the mutation means 600 (step 60 in FIG. 1) will be discussed in detail with reference to FIGS. 11 and 12A to 12D.

Figure 11:
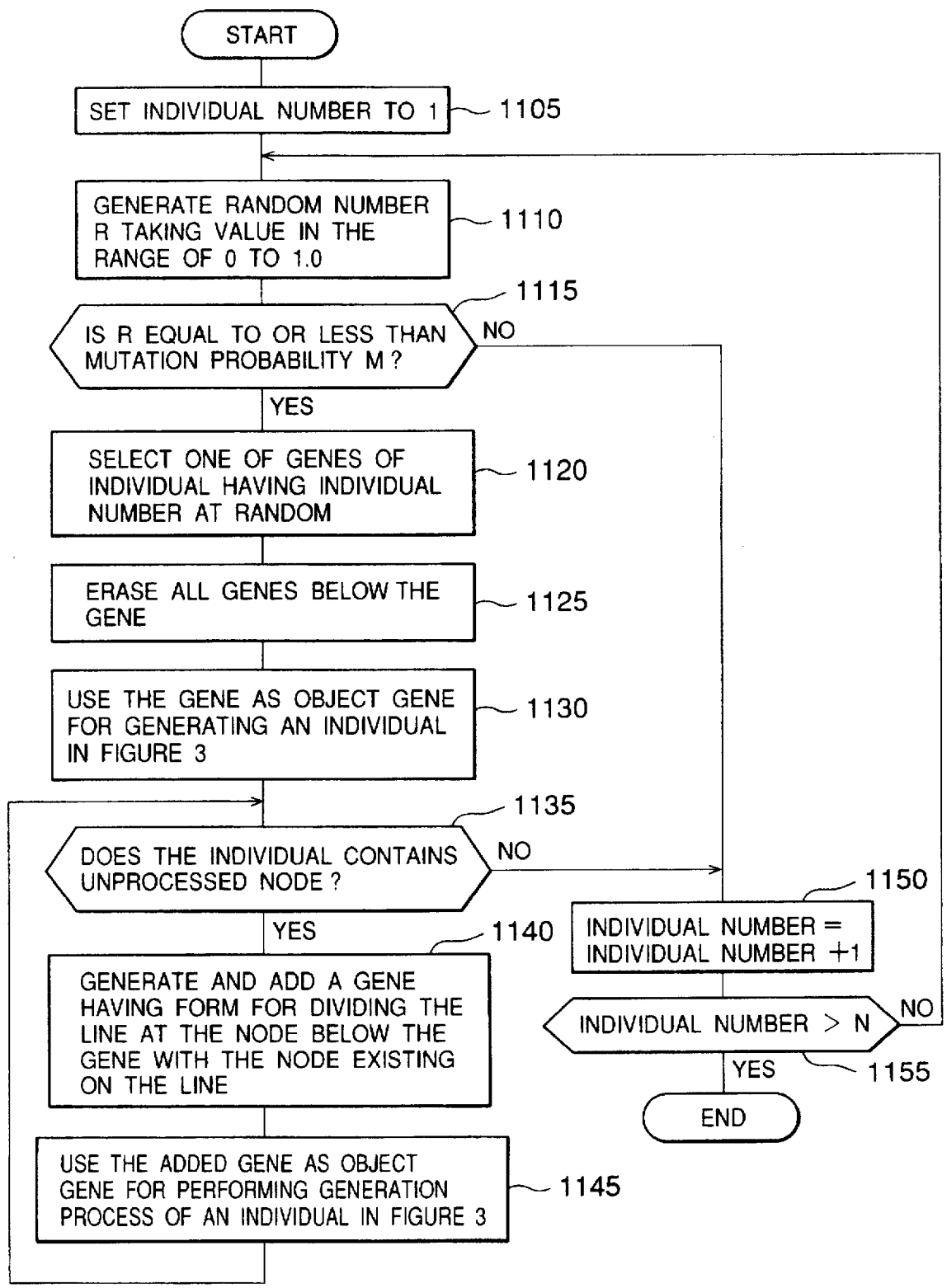
FIG. 11 is a flowchart showing a process procedure performed by mutation means.

FIG. 11 is a flowchart showing a mutation process procedure in detail.

First, at step 1105, the individual number is set to 1.

Next, at step 1110, a random number R taking values in the range of 0 to 1.0 is generated. At step 1115, whether or not the generated R is a value equal to or less than preset mutation probability M is determined.

If the generated R is a value equal to or less than the preset mutation probability M, one of the genes of the individual having the individual number is selected at random at step 1120. All genes existing below the gene (all subordinate genes to the gene in the tree structure) are erased at step 1125. The gene is used as the object gene for performing the generation process of an individual discussed with reference to FIG. 3 at step 1130. Whether or not the individual contains an unprocessed node is determined at step 1135. If it contains an unprocessed node, a gene having a form for dividing the line on which the node exists at the node is generated and added below the gene with the node existing on the line at step 1140. The added gene is used as the object gene for performing the individual generation process discussed with reference to FIG. 3 at step 1145, then control returns to step 1135.

For selection of one gene at random at step 1120, for example, numbers are assigned to existing genes, a random number that can take a value in the range of the numbers is generated, and the gene corresponding to the generated value is selected.

If an unprocessed node is not contained at step 1135, one is added to the individual number at step 1150 and whether or not the value of the individual number is greater than the number of individuals in the group, N, is determined at step 1155. If the value of the individual number is equal to or less than N, control returns to step 1110.

If R is greater than M at step 1115, control branches to step 1150. Further, if the value of the individual number is greater than N at step 1155, the mutation process is terminated.

Figure 12A:
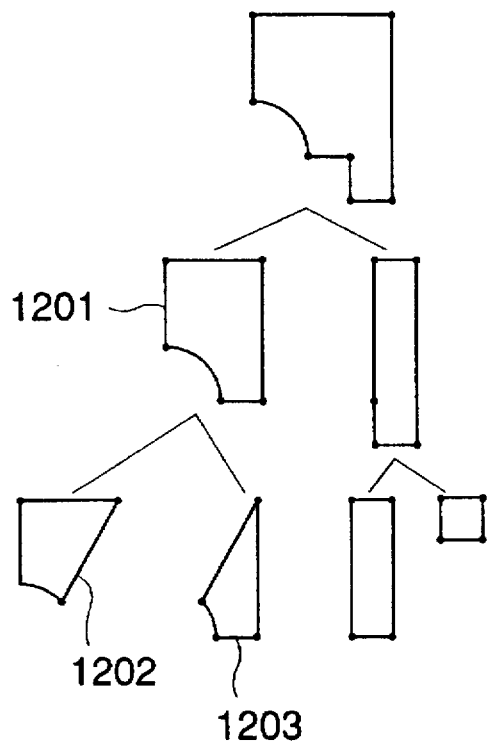
FIGS. 12A to 12D are illustrations of a mutation process example.
Figure 12B:
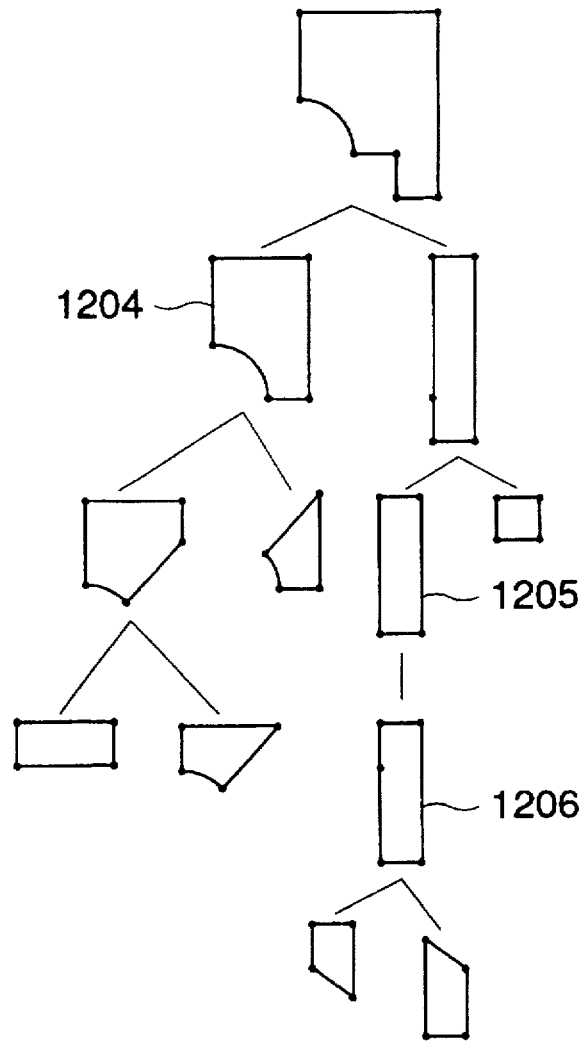
Figure 12C:
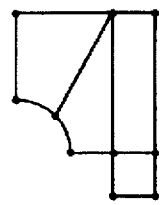
Figure 12D:
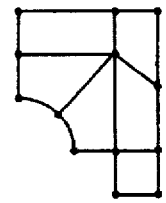

FIGS. 12A to 12D is an illustration of a mutation process example; FIG. 12A shows an individual example before a mutation process is executed and FIG. 12B shows a division example after a mutation process is executed for the individual in FIG. 12A, wherein the gene having a form 1201 is the same as the gene having a form 1204. FIGS. 12C and 12D show the area division forms for FIGS. 12A and 12B respectively.

Next, an operation example of the mutation process for one individual will be discussed with reference to FIGS. 11 and 12A to 12D.

First, at step 1115, the R value becomes equal to or less than M. A gene corresponding to form 1201 of the individual having the individual number shown in FIG. 12A is selected at random (step 1120). Genes corresponding to forms 1202 and 1203 placed below the selected gene in the tree structure are erased (step 1125). The gene corresponding to the form 1201 is used as the object gene for performing the generation process of an individual discussed with reference to FIG. 3 (step 1130), thereby generating forms existing below the form 1204 in the tree structure shown in FIG. 12B.

Whether or not the individual contains an unprocessed node is determined (step 1135). Since it contains an unprocessed node, a gene corresponding to a form 1206 for dividing the line at the unprocessed node is generated and added below the gene corresponding to a form 1205 with the node existing on the line (step 1140). The added gene is used as the object gene for performing the generation process of an individual discussed with reference to FIG. 3 (step 1140), thereby generating new forms existing below the form 1206. Then, control returns to step 1135. Since the individual does not contain an unprocessed node, control branches to step 1150, and the mutation process for one individual is terminated. As a result, the area division form shown in FIG. 12C mutates to the area division form as shown in FIG. 12D.

Next, the division-into-meshes process performed by the division-into-meshes means 700 (step 70 in FIG. 1) will be discussed in detail with reference to FIGS. 13 and 14.

Figure 13:
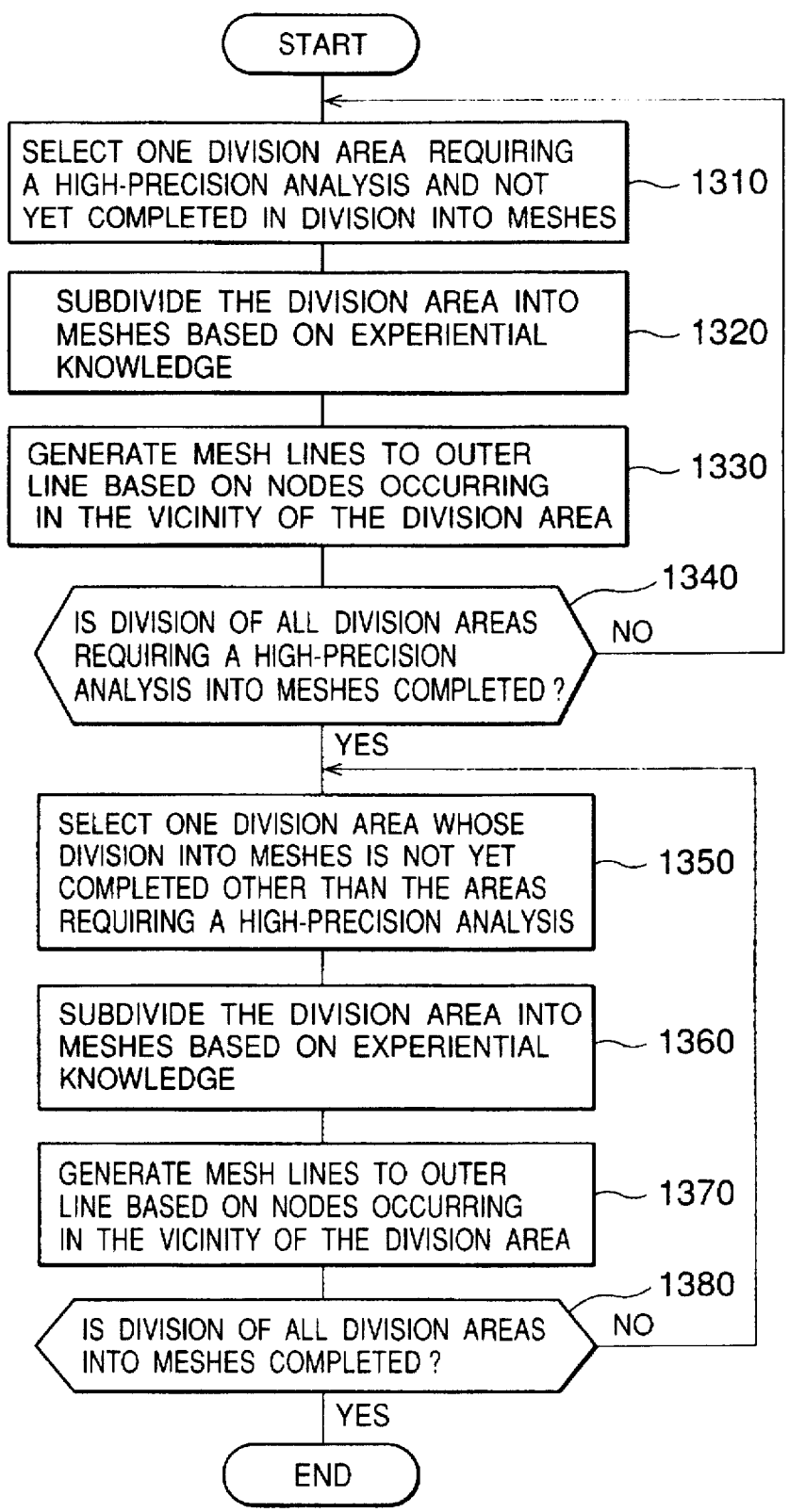
FIG. 13 is a flowchart showing a process procedure performed by division-into-meshes means.

FIG. 13 is a flowchart for illustrating a division-into-meshes process procedure in detail.

For example, one division area requiring a high-precision analysis and not yet completed in division into meshes is selected at step 1310.

Next, the selected division area is subdivided into meshes according to a prestored division rule based on experiential knowledge at step 1320. Mesh lines are generated to the visible outline, a line representing the outermost form of the division object form, based on nodes occurring in the vicinity of the division area at step 1330.

Whether or not division of all division areas requiring a high-precision analysis into meshes is completed is determined at step 1340.

For example, the analyst specifies all division areas requiring a high-precision analysis by using the input means 100 such as a mouse for indicating the area requiring subdivision while observing the form division state displayed on the display screen by the mesh output means 800 after the process sequence (division process discussed with reference to FIGS. 1 to 12A to 12D) has been performed.

If division of all division areas requiring a high-precision analysis into meshes is not completed, control returns to step 1310.

Next, if division of all division areas requiring a high-precision analysis into meshes is completed at step 1340, one division area whose division into meshes is not yet completed other than the areas requiring a high-precision analysis is selected at step 1350 and the selected division area is subdivided into meshes using any one of prestored division rules based on experiential knowledge at step 1360. Mesh lines, namely, area division lines are generated to the visible outline based on nodes occurring in the vicinity of the division area at step 1370. Whether or not division of all division areas is completed is determined at step 1380. If it is not all completed, control returns to step 1350.

If division of all division areas is completed at step 1380, the division-into-meshes process is terminated.

Figure 14A:
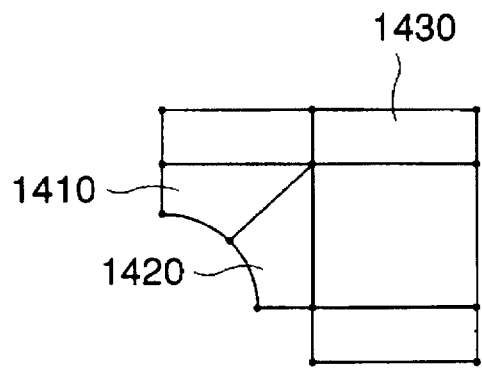
FIGS. 14A to 14F are illustrations showing an example of division of a given form into meshes.
Figure 14B:
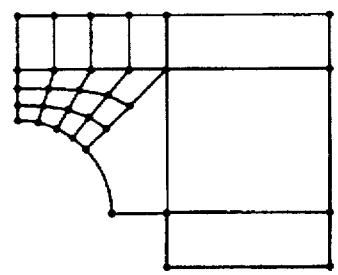
Figure 14C:
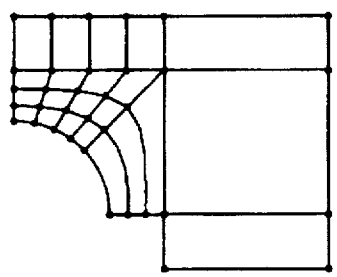
Figure 14D:
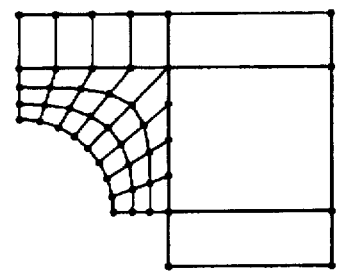
Figure 14E:
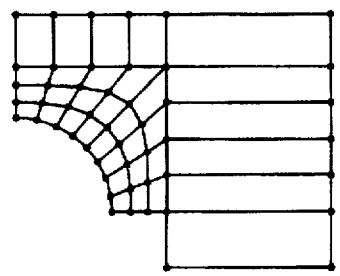
Figure 14F:
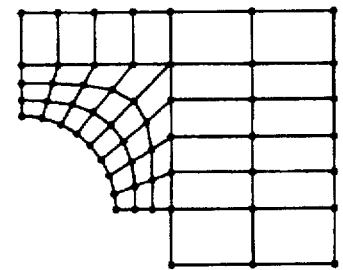

FIGS. 14A to 14F are illustrations showing an example of division of a given form into meshes; FIG. 14A shows the form whose division into areas is completed, FIGS. 14B to 14E show how to divide division areas requiring a high-precision analysis into meshes and generate mesh lines from new occurring nodes, and FIG. 14F shows the final form division state of division areas not requiring a high-precision analysis after the division-into-meshes process is completed.

An operation example of the division-into-meshes means 700 will be discussed with reference to FIGS. 13 and 14A to 14F.

FIG. 14A shows the form, whose division into areas is completed, to which the division-into-meshes process is applied, wherein areas 1410 and 1420 are areas requiring a high-precision analysis.

First, the area 1410 is selected as a division area requiring a high-precision analysis and not yet completed in division into meshes (step 1310). For example, the area 1410 is subdivided into meshes based on conditions such as the upper limit of the mesh size determined by experiential knowledge considering the analysis conditions, thereby providing the form shown in FIG. 14B (step 1320).

Mesh lines are generated to the outer line based on nodes occurring at step 1320, thereby providing the form shown in FIG. 14C (step 1330). Since another division area requiring a high-precision analysis and not yet completed in division into meshes exists (step 1340), the area 1420 is selected (step 1310) and is subdivided into meshes for providing the form shown in FIG. 14D. Mesh lines are generated to the outer line based on nodes occurring at step 1320, thereby providing the form shown in FIG. 14E (step 1330).

Since division of all division areas requiring a high-precision analysis into meshes is completed (step 1340), an area 1430 is selected as an area whose division into meshes is not yet completed other than the areas requiring a high-precision analysis (step 1350). The area 1430 is subdivided into meshes using any one of prestored division rules based on experiential knowledge (step 1360).

Mesh lines are generated to the outer line based on nodes occurring in the vicinity of the area 1430, thereby providing the form shown in FIG. 14F (step 1370). If it is determined that other areas are sufficiently divided into meshes (for example, the observer may make the determination by observing the division state displayed by the mesh output means 800 or for automatic determination, the process may be terminated, for example, when the size of each division piece becomes equal to or less than a predetermined value), division of all division areas into meshes is completed (step 1380), the division-into-meshes process is terminated, and the division form shown in FIG. 14F is generated as the final mesh form.

The division form is output to the mesh output means 800 by the mesh output process (step 80 in FIG. 1).

We have discussed the embodiment by taking the division process of a two-dimensional form as an example, but the division process of a three-dimensional form can also be accomplished by replacing the two-dimensional division lines and mesh lines with division planes and mesh planes. In the embodiment, we have discussed the division process according to the invention mainly for finite element method analysis, but the invention can also be applied to various fields as a division process method of a given form, such as modeling processing in computer graphics.

Thus, the invention can provide means for performing a mesh generation process in a simple configuration making the most of the analyst's experiential knowledge.

According to the invention, means for performing a mesh generation process in a simple configuration making the most of analyst's experiential knowledge can be provided, for example, for the mesh generation process of the analysis object in various analyses using the finite element method. The invention can be applied to any forms of the analysis objects and enables automatic generation of meshes at desired coarseness.

What is claimed is:

1. A method, in an object division form system, of generating object division forms into which an inputted form of an object is divided using a genetic algorithm, said method comprising steps, performed by said object division form system, of:

providing, as a data structure of a gene, an area form of the inputted form of the object, a division rule number assigned to the gene, and information indicative of at least one other gene generated by further dividing the area form concerning the gene;

providing, as a data structure of a chromosome, a tree structure of genes having area forms into which the inputted form of the object is sequentially divided;

providing an evaluation rule in which, at least, an evaluation value increases as an internal angle at each node constituting the area form approaches 90°;

if the two object division forms selected in accordance with the evaluation values of the object division forms contain area forms that can be exchanged in a state in which the object form can be retained, performing a crossover process of exchanging the area forms so as to generate two new object division forms;

performing a mutation process of dividing at least one divisible area form constituting a part of the object division form in accordance with any one of prepare division rule for dividing area forms; and performing an end determination process of determining whether the evaluation value for one object division form satisfies a predetermined end determination criterion so as to terminate processing operations, wherein, if the inputted form of the object is a two-dimensional form or a three-dimensional shell form, a plurality of quadrangle elements are generated based thereon, and wherein, if the inputted form is a three-dimensional solid form, a plurality of hexahedron elements are generated based thereon.

2. The object form division method as claimed in claim 1 further comprising the step of arbitrarily selecting at least one division rule among prepared division rules for dividing areas and dividing said optimum area division form according to the selected division rules.

3. A system for generating object division forms into which an inputted form of an object is divided using a genetic algorithm, comprising:

means for inputting a form of an object;

means for displaying at least the object form;

storage means for assigning numbers to a plurality of prepared division rules for dividing the object form and storing the division rules with the numbers;

area division means for generating N (which is a natural number) object division forms by dividing the object form in accordance with a division rule;

evaluation means for finding an evaluation value for each object division form in accordance with a predetermined evaluation rule in which, at least, an evaluation value increases as an internal angle at each node constituting the area form comes close to 90°;

end determination means for, if at least one of the found evaluation values satisfies a predetermined division end determination criterion, determining that the object division form corresponding to the evaluation value is an optimum area division form resulting from dividing the object form into areas;

selection means for, if none of the evaluation values satisfy the predetermined division end determination criterion, selecting two among the N object division forms in accordance with the evaluation value;

crossover means for, if the divided area forms that can be exchanged in a state in which the object form can be retained exist, performing a crossover process of exchanging the area forms to generate new object division forms until N object division forms are generated;

mutation means for performing a mutation process of dividing at least one divisible area form constituting a part of the object division form in accordance with one division rule arbitrarily selected among the division rules stored in said storage means; and start control means for starting said selection means, said crossover means and said mutation means until the evaluation value for one object division form satisfies the division end determination criterion, wherein, if the inputted form of the object is a two dimensional form or a three dimensional shell form, a plurality of quadrangle elements are generated based thereon, and wherein, if the inputted form thereof is a three-dimensional solid form, a plurality of hexahedron elements are generated based thereon.

4. The object form division system as claimed in claim 3 further including:

third storage means for storing division rules for dividing areas; and division-into-meshes means for arbitrarily selecting at least one division rule among the division rules stored in said third storage means and dividing said optimum area division form according to the selected division rules.

5. A method, in an object division form system, of generating object division forms into which inputted form of an object is divided using a genetic algorithm, said method comprising steps, performed by said object division form system, of:

providing, as a data structure of a gene, an area form of the inputted form of the object, a division rule number assigned to the gene, information indicative of at least one other gene generated by further dividing the area form concerning the gene;

providing, as a data structure of chromosome, a tree structure of the genes having area forms into which the inputted form of the object is sequentially divided;

if the two object division forms selected in accordance with the evaluation values of the object division forms contain the area forms that can be exchanged in a state in which the object form can be retained, performing a crossover process of exchanging the area forms so as to generate two new object division forms; and performing a mutation process of dividing at least one divisible area form constituting a part of the object division form in accordance with any one of prepared division rules for dividing area forms, wherein, if the inputted form of the object is a two dimensional form or a three dimensional shell form, a plurality of quadrangle elements are generated based thereon, and wherein, if the inputted form thereof is a three dimensional solid form, a plurality of hexahedron elements are generated based thereon.

\* \* \* \* \*